United States Patent [19]

Magrill

[11] Patent Number: 5,329,591
[45] Date of Patent: Jul. 12, 1994

[54] TRANSMITTER IDENTIFICATION AND VALIDATION SYSTEM AND METHOD

[76] Inventor: Barry J. Magrill, P.O. Box 1010, Fairfield, Fla. 32634

[21] Appl. No.: 52,378

[22] Filed: Apr. 23, 1993

[51] Int. Cl.⁵ .............................................. H04K 1/00
[52] U.S. Cl. ...................................... 380/25; 380/23; 375/1; 375/95; 340/572
[58] Field of Search .............. 380/23, 25; 375/1, 95.1; 340/372

[56] References Cited

U.S. PATENT DOCUMENTS

| | | | |
|---|---|---|---|
| 4,918,425 | 4/1990 | Greenberg et al. | 340/572 |
| 5,159,596 | 10/1992 | Itoh | 370/95.1 |
| 5,191,610 | 3/1993 | Hill et al. | 380/23 |

*Primary Examiner*—David C. Cain
*Attorney, Agent, or Firm*—John R. Flanagan

[57] ABSTRACT

A transmitter identification and validation system and method are operable to receive a signal transmitted by a subject transmitter and produce first and second output signals corresponding to the received signal, evaluate the first and second output signals and extract and produce respectively therefrom an observed identification (ID) code corresponding to the subject transmitter of the received signal and an observed parameter value corresponding to a parameter of the received signal, store in memory sets of ID codes and parameter values corresponding to valid transmitters, compare the observed ID code and parameter value of the received signal from the subject transmitter with the stored sets of stored ID codes and parameter values, and, as a result of the comparison, determine whether the subject transmitter of the received signal matches one of the valid transmitters. The system and method are also operable to update the stored parameter value of the one of valid transmitters with the observed parameter value of the subject transmitter in response to determining that the subject transmitter matches the one valid transmitter.

20 Claims, 1 Drawing Sheet

TRANSMITTER IDENTIFICATION AND VALIDATION SYSTEM AND METHOD

BACKGROUND OF THE INVENTION

1. Field of the Invention

The present invention generally relates to techniques for characterizing a transmitter and, more particularly, is concerned with a system and method for identifying and validating a transmitter by extracting and analyzing both an identification (ID) code and a signal characteristic.

2. Description of the Prior Art

In some known prior art communications systems, individual transmitters are assigned identification (ID) code in order to validate their use of the network. Typically these ID codes accompany other communications transmitted by the transmitter. In the case of cellular telephone systems, the absence of a valid ID code is used to detect invalid transmitters on the network so that steps can be taken to lock them out of the network without disrupting service to legitimate users.

In other known prior art communications systems, such as disclosed in U.S. Pat. No. 5,005,210 to Ferrell, one or more parameters of a transient signal transmitted by the transmitter is used to identify and verify the particular transmitter. However, neither of these prior art communications systems embody the necessary levels of security required to ensure the reliability of the identification and validation process.

Consequently, a need still exists for an improved technique for ensuring reliability of the identification and validation process.

SUMMARY OF THE INVENTION

The present invention provides a transmitter identification and validation apparatus and method designed to satisfy the aforementioned needs.

One unique feature of the identification and validation system of the present invention is the ability to compare signal characteristics to a purported ID encoded in the transmitted signal. Prior art systems rely exclusively on either analysis of the signal characteristics or on the encoded ID in attempting to validate legitimate signals, but have not used both to improve the reliability of the validation process.

Another unique feature of the identification and validation system of the present invention is the self-training ability of the system. While in operation the system can learn the identification and characteristics of previously unknown transmitters and can update the stored characteristics of previously known transmitters in order to adapt to slowly changing characteristics of the transmitters which occur over time.

Accordingly, the present invention is directed to a transmitter identification and validation system and method being operable to: (a) receive a signal transmitted by a subject transmitter and produce first and second output signals corresponding to the received signal; (b) evaluate the first and second output signals and extract and produce respectively therefrom an observed identification (ID) code corresponding to the subject transmitter of the received signal and at least one observed parameter value corresponding to a parameter of the received signal; (c) store in memory sets of ID codes and parameter values corresponding to valid transmitters; (d) compare the observed ID code and parameter value of the received signal from the subject transmitter with the sets of stored ID codes and parameter values; and (e) as a result of the comparison, determine whether the subject transmitter of the received signal matches one of the valid transmitters. The system and method are also operable to update the stored parameter value of the one valid transmitter with the observed parameter value of the subject transmitter in response to determining that the subject transmitter matches the one valid transmitter.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWING

In the following detailed description, reference will be made to the attached drawings in which:

The single FIGURE is a block diagram of the transmitter identification and validation system in accordance with the present invention.

DETAILED DESCRIPTION OF THE INVENTION

Figure 1:
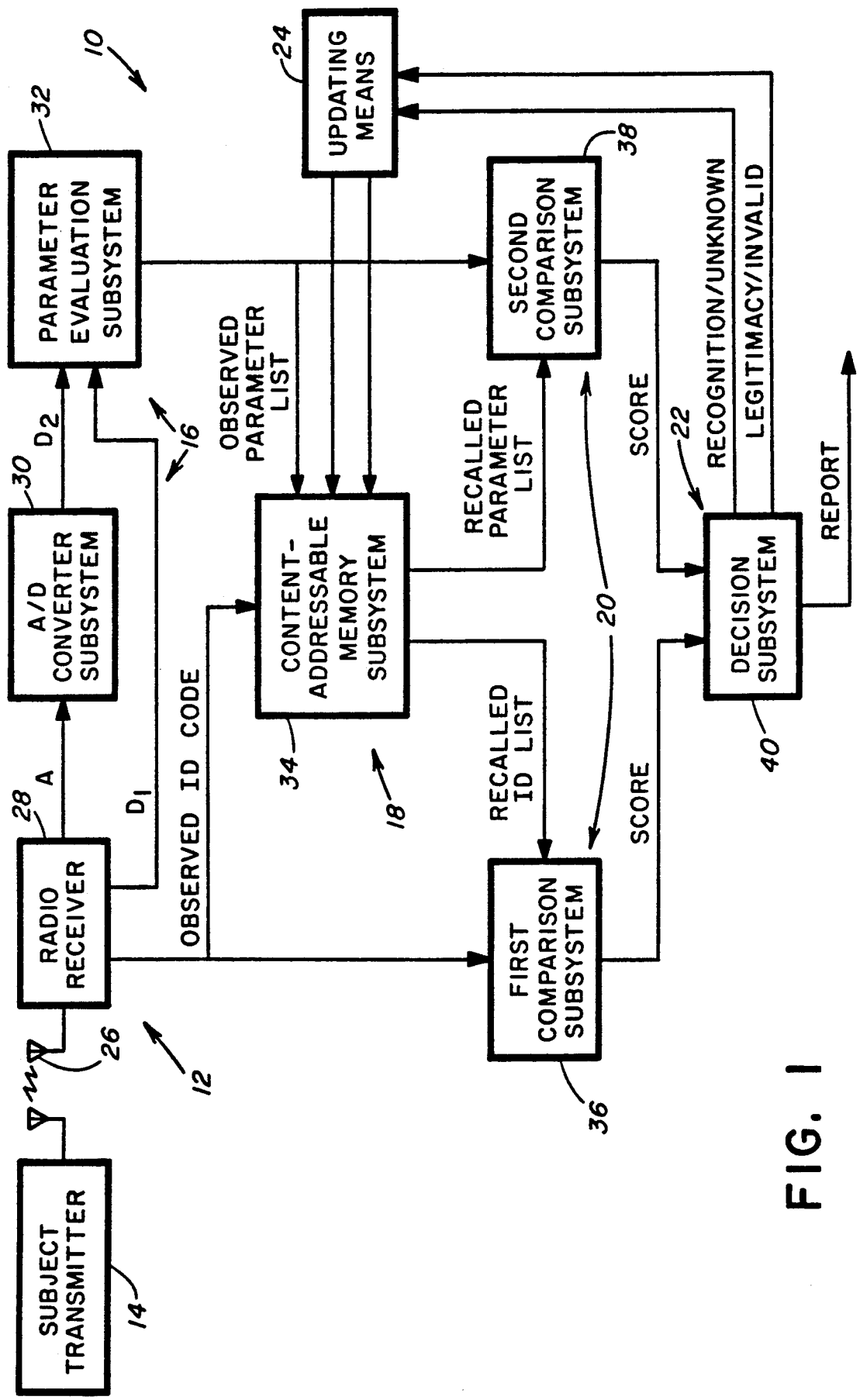

Referring to the single figure of the drawing, there is illustrated a transmitter identification and validation system in accordance with the present invention, being generally designated 10. In its basic components, the system 10 includes: means 12 for receiving a signal transmitted by an unknown or subject transmitter 14 and producing output signals corresponding to the received signal; means 16 for evaluating the output signals and extracting and producing respectively therefrom an observed identification (ID) code corresponding to the subject transmitter 14 of the received signal and at least one and preferably a plurality of observed parameter values corresponding to a plurality of characteristics or parameters of the received signal; means 18 for storing sets of ID codes and parameter values corresponding to known or valid transmitters of a network with which the system 10 is associated; means 20 for comparing the observed ID code and parameter value of the received signal from the subject transmitter 14 with sets of stored ID codes and parameter values; and means 22 for determining, as a result of the comparing, whether the subject transmitter 14 of the received signal matches one of the valid transmitters. The system 10 also includes means 24 for updating the stored parameter values of the one valid transmitter with the observed parameter values of the subject transmitter 14 in response to determining that the subject transmitter 14 matches the one valid transmitter.

More particularly, the receiving means 12 includes an antenna 26 and a radio receiver 28. The antenna 26 and radio receiver 28 each can be implemented by any one of many well-known conventional components. The antenna 26 receives the signal transmitted by the subject transmitter 14. The radio receiver 28 coupled to the antenna 26 receives the signal to be analyzed from the antenna 26 and produces the first and second output signals which are derived from the received signal. The first derived output signal is the Observed ID Code of the subject transmitter 14, whereas the second derived output signal includes one or more analog signals A and one or more digital signals $D_1$ derived from the received signal, e.g. amplitude demodulated signal, frequency demodulated signal, rate of change of frequency, demodulated digital signalling, etc, which are the observed parameter values corresponding to the plurality of characteristics or parameters of the received signal.

The evaluating means 16 basically includes an analog-to-digital (A/D) converter subsystem 30 and parameter evaluation subsystem 32. The A/D converter subsystem 30 of the evaluating means 16 includes the necessary low-pass filters to convert analog receiver output signal A to digital format signals $D_2$. In one implementation, the A/D converter subsystem 30 is provided by a Motorola MC68HC11 processor having built-in A/D conversion capability.

The parameter evaluation subsystem 32 of the evaluating means 16 receives and inspects the digital signals $D_1$, $D_2$ from the receiving means 12 and assigns values to various signal parameters, creating an Observed Parameter List. In one implementation, the parameter evaluation subsystem 32 is in the form of software running on an IBM PC compatible computer. However, the particular form of the implementation of the parameter extraction subsystem 32 is not critical to the operation of the system 10. It could be implemented partially or wholly in hardware, including analog methods applied before the A/D conversion process.

Examples of the various signal parameters include rate of change of signal amplitude at a specific time; ratio of signal amplitudes at two different times; rate of change of signal frequency at a specific time, instantaneous frequency at a specific time, FM modulation index, AM modulation percentage, digital data rates, and frequency content of detected audio, but there are other parameters that can be used. "Time", as referred to here, is measured relative to some distinguishable feature of the signal, such as when it first exceeds some threshold value, or the start of the digitally encoded identification (MIN/ESN) on a cellular telephone signal. Different parametes may be measured relative to different time references as appropriate.

The Observed ID Code produced by the receiving means 12 can be one which is often present in signals used in networks. It may be encoded using a variety of digital or analog signalling methods. For example, the MIN and ESN used in cellular telephone networks provide appropriate identification information. The Observed ID Code and Observed Parameter List are utilized by the storing means 18 and comparing means 20 of the system 10 as described below.

The storing means 18 of the system 10 includes a content-addressable memory subsystem 34. The content-addressable memory subsystem 34 can be implemented using any of a variety of methods. In one implementation, memory subsystem 34 takes the form of software running on an IBM PC compatible computer. It could also be implemented using a hardware system optimized for operation as a content-addressable memory, a neural-network-based associative memory, etc. The memory subsystem 34 when given the Observed Parameter List produces a Recalled ID List containing candidate ID codes corresponding to those features, and/or when given the Observed ID Code produces a Recalled Parameter List containing candidate parameter values expected to be observed for that Recalled ID List. Either or both modes (directions) of operation may be used in a specific implementation of the system 10.

The comparing means 20 of the system 10 includes at least one and preferably a pair of first and second comparison subsystems 36, 38 that compare the output of the memory subsystem 34 to the observed values. For example, at first comparison subsystem 36, a comparison is made between the Observed ID Code (MIN-ESN in a cellular telephone network) extracted from the received signal, and the Recalled ID List recalled by the content-addressable memory subsystem 34 as being candidates for matching the Observed Parameter List. At the second comparison subsystem 38, a comparison is made between the Observed Parameter List and the Recalled Parameter List recalled by the content-addressable memory subsystem 34 in response to the Observed ID Code extracted from the received signal. Each comparison subsystem 36, 38 provides as an output a Score that indicates how strong the match was between the items compared. The comparison between the Observed ID Code and Recalled ID List results in a yes/no indication of whether the Observed ID Code appeared on the Recalled ID List from the memory subsystem 34. The comparison between the Observed Parameter List and the Recalled Parameter List from the memory subsystem 34 results in a multi-valued output indicating the degree of match between the respective parameter lists. In one implementation, the first and second comparison systems 36, 38 take the form of software running on an IBM PC compatible computer. They could also be implemented using a hardware circuitry.

The determining means 22 of the system 10 includes a decision subsystem 40 which functions to evaluate the above-described results of the comparison subsystems 36, 38. The decision subsystem 40 provides two outputs: one a Recognition signal which indicates that the signal is recognized (i.e. the observed ID and/or observed parameters have been previously stored) or an Unknown signal which indicates the signal is not recognized (i.e. the system has not previously collected information about signal characteristics for this MIN/ESN); and another a Legitimacy signal which indicates (if the signal was recognized) the likelihood that the signal is legitimate within the particular network (i.e. the observed parameters are reasonably close to those previously observed as being associated with the observed ID encoded in the signal) or an Invalid signal which indicates the signal is not legitimate. These outputs are available to other systems, not part of the system 10, which implement appropriate action. For example, in the context of a cellular telephone system, a recognized signal with a high legitimacy index corresponds to a high degree of confidence that the signal is legitimate within the system, and that the call should be allowed to proceed. A recognized signal with a medium legitimacy index implies that the signal may be fraudulent, and should be reported for further investigation by other means, but the call should still be allowed to proceed. A recognized signal with a low legitimacy index indicates that the signal is probably fraudulent and the call should not be allowed to proceed, and should also be reported for further investigation.

An important feature of the system is that the outputs of the decision subsystem 40 are provided to the content-addressable memory via the updating means 24 which can then update stored information appropriately. This allows the system 10 to adapt to slowly changing signal characteristics caused by transmitter aging, etc., and to learn new transmitters automatically. In one implementation, the decision subsystem 40 and updating means 24 take the form of software running on an IBM PC compatible computer. They could also be implemented using a hardware circuitry.

It should be realized that the precise components making up an implementation of the system 10 are not critical to the operation of the system 10. It is only necessary that the components selected for the particular implementation provide the functions of the system 10, which have been described above.

It is thought that the present invention and its advantages will be understood from the foregoing description and it will be apparent that various changes may be made thereto without departing from the spirit and scope of the invention or sacrificing all of its material advantages, the form hereinbefore described being merely a preferred or exemplary embodiment thereof.

I claim:

1. A transmitter identification and validation system, comprising:
   (a) means for receiving a signal transmitted by a subject transmitter and producing first and second output signals corresponding to the received signal;
   (b) means for evaluating the first and second output signals and extracting and producing respectively therefrom an observed identification (ID) code corresponding to the subject transmitter of the received signal and at least one observed parameter value corresponding to at least one parameter of the received signal;
   (c) means for storing sets of ID codes and parameter values corresponding to valid transmitters;
   (d) means for comparing the observed ID code and observed parameter value of the received signal from the subject transmitter with said stored sets of ID codes and of parameter values and for generating, in response to the comparing, a pair of scores respectively proportional to the degree of match of the observed ID code with one of stored ID codes and to the degree of match of the observed parameter value with one of the stored parameter values; and
   (e) means for evaluating the respective scores generated by said comparing means and for deciding, first, based on one of the scores whether or not the subject transmitter of the received signal is recognized as matching one of the valid transmitters and, second, based on the other of the scores the likelihood that the subject transmitter of the received signal is legitimate.

2. The system of claim 1 further comprising:
   means for updating said stored parameter value of said one of the valid transmitters with the observed parameter value of the subject transmitter in response to deciding that the subject transmitter is recognized and has a sufficient likelihood of legitimacy.

3. The system of claim 1 wherein said receiving means includes:
   an antenna for receiving the signal transmitted by the subject transmitter; and
   a radio receiver for receiving the signal received by the antenna and producing the first and second output signals corresponding to the received signal.

4. The system of claim 1 wherein said evaluating means includes a digital computer for receiving and evaluating the first output signal and the second output signal and assigning values thereto corresponding the observed ID code and the observed parameter of the received signal.

5. The system of claim 1 wherein the first output signal is a digital signal and the second output signal includes an analog signal.

6. The system of claim 5 wherein said evaluating means includes an analog-to-digital converter for converting said analog signal produced by said receiver to digital signal.

7. The system of claim 1 wherein the observed parameter of the received signal is selected from the following set of parameters: rate of change of signal amplitude at a specific time; ratio of signal amplitudes at two different times; rate of change of signal frequency at a specific time; instantaneous frequency at a specific time; frequency modulation index; and amplitude modulation percentage.

8. The system of claim 1 wherein said storing means includes a content-addressable memory for storing said sets of stored ID codes and parameter values corresponding to valid transmitters and, in response to receiving said observed parameter value, for recalling a stored ID code corresponding thereto and, in response to receiving said observed ID code, for recalling a stored parameter value corresponding thereto.

9. The system of claim 8 wherein said comparing means includes a pair of comparison devices, one of said comparison devices for receiving and comparing said observed ID code with said stored ID code and generating said score proportional to the degree of match between said compared codes, the other of said comparison device for receiving and comparing said observed parameter value with said stored parameter value and generating said score proportional to the degree of match between said parameter values.

10. A transmitter identification and validation system, comprising:
   (a) means for receiving a signal transmitted by a subject transmitter and producing first and second output signals corresponding to the received signal;
   (b) means for evaluating the first and second output signals and extracting and producing respectively therefrom an observed identification (ID) code corresponding to the subject transmitter of the received signal and a plurality of observed parameter values corresponding to a plurality of parameters of the received signal;
   (c) means for storing sets of ID codes and parameter values corresponding to valid transmitters;
   (d) means for comparing the observed ID code and the plurality of observed parameter values of the received signal from the subject transmitter with said stored sets of ID codes and of parameter value and for generating, in response to the comparing, a pair of scores respectively proportional to the degree of match of the observed ID code with one of the stored ID codes and to the degree of match of the observed parameter value with one of the stored parameter values; and
   (e) means for evaluating the respective scores generated by said comparing means and for deciding, first, based on one of the scores whether or not the subject transmitter of the received signal is recognized as matching one of the valid transmitters and, second, based on the other of the scores the likelihood that the subject transmitter of the received signal is legitimate.

11. The system of claim 10 further comprising:
means for updating said stored parameter value of said one of the valid transmitters with the observed parameter value of the subject transmitter in response to deciding that the subject transmitter is recognized and has a sufficient likelihood of legitimacy.

12. The system of claim 10 wherein said receiving means includes:
an antenna for receiving the signal transmitted by the subject transmitter; and
a radio receiver for receiving the signal received by the antenna and producing the first and second output signals corresponding to the received signal.

13. The system of claim 10 wherein said evaluating means includes a digital computer for receiving and evaluating the first output signal and the second output signal and assigning values thereto corresponding the observed ID code and the plurality of observed parameters of the received signal.

14. The system of claim 10 wherein the first output signal is a digital signal and the second output signal includes an analog signal.

15. The system of claim 14 wherein said evaluating means includes an analog-to-digital converter for converting said analog signal produced by said receiver to digital signal.

16. The system of claim 10 wherein the plurality of observed parameters of the received signal are selected from the following set of parameters: rate of change of signal amplitude at a specific time; ratio of signal amplitudes at two different times; rate of change of signal frequency at a specific time; instantaneous frequency at a specific time; frequency modulation index; and amplitude modulation percentage.

17. The system of claim 10 wherein said storing means includes a content-addressable memory for storing said sets of stored ID codes and parameter values corresponding to valid transmitters and, in response to receiving said plurality of observed parameter values, for recalling a stored ID code corresponding thereto and, in response to receiving said observed ID code, for recalling a plurality of stored parameter values corresponding thereto.

18. The system of claim 17 wherein said comparing means includes a pair of comparison devices, one of said comparison devices for receiving and comparing said observed ID code with said stored ID code and generating said score proportional to the degree of match between said compared codes, the other of said comparison devices for receiving and comparing said observed parameter value with said stored parameter value and generating said score proportional to the degree of match between said parameter values.

19. A transmitter identification and validation method, comprising the steps of:
(a) receiving a signal transmitted by a subject transmitter and producing first and second output signals corresponding to the received signal;
(b) evaluating the first and second output signals and extracting and producing respectively therefrom an observed identification (ID) code corresponding to the subject transmitter of the received signal and an observed parameter value corresponding to a parameter of the received signal;
(c) storing in a memory sets of ID codes and parameter values corresponding to valid transmitters;
(d) receiving the observed ID code and the observed parameter value and, in response thereto, recalling a stored ID code and a store parameter value corresponding thereto;
(e) comparing the observed ID code and the observed parameter value of the received signal from the subject transmitter respectively with the recalled ID code and the recalled parameter value;
(f) generating, in response to the comparing, a pair of scores respectively proportional to the degree of match of the observed ID code with one of store ID codes and to the degree of match of the observed parameter value with one of the stored parameter values; and
(g) evaluating the respective scores and deciding, first, based on one of the scores whether or not the subject transmitter of the received signal is recognized as matching one of the valid transmitters and, second, based on the other of the scores the likelihood that the subject transmitter of the received signal is legitimate.

20. The method of claim 19 further comprising the step of:
updating said stored parameter value of said one of the valid transmitters with the observed parameter value of the subject transmitter in response to deciding that the subject transmitter is recognized and has a sufficient likelihood of legitimacy.

* * * * *